United States Patent
Takeoka et al.

(10) Patent No.: US 9,640,324 B2
(45) Date of Patent: May 2, 2017

(54) METALLIZED FILM CAPACITOR

(71) Applicant: PANASONIC INTELLECTUAL PROPERTY MANAGEMENT CO., LTD., Osaka (JP)

(72) Inventors: Hiroki Takeoka, Nara (JP); Kazuhiro Nakatsubo, Toyama (JP); Hiroshi Kubota, Toyama (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 84 days.

(21) Appl. No.: 14/402,313

(22) PCT Filed: May 23, 2013

(86) PCT No.: PCT/JP2013/003275
§ 371 (c)(1),
(2) Date: Nov. 20, 2014

(87) PCT Pub. No.: WO2013/179612
PCT Pub. Date: Dec. 5, 2013

(65) Prior Publication Data
US 2015/0138691 A1   May 21, 2015

(30) Foreign Application Priority Data
Jun. 1, 2012 (JP) .................. 2012-125726

(51) Int. Cl.
*H01G 4/32* (2006.01)
*H01G 4/015* (2006.01)
(Continued)

(52) U.S. Cl.
CPC .............. *H01G 4/32* (2013.01); *H01G 4/012* (2013.01); *H01G 4/015* (2013.01); *H01G 4/18* (2013.01); *Y02T 10/7022* (2013.01)

(58) Field of Classification Search
CPC ..................................................... H01G 4/015
(Continued)

(56) References Cited

U.S. PATENT DOCUMENTS 5,615,078 A   3/1997   Hudis et al.
5,696,663 A   12/1997  Unami et al.
(Continued)

FOREIGN PATENT DOCUMENTS

CN   1175319     3/1998
CN   101156224   4/2008
(Continued)

OTHER PUBLICATIONS

Accuratus, Aluminum Oxide, Al2O3, http://www.accuratus.com/alumox.html, Oct. 8, 2002, p. 1-3.*
(Continued)

*Primary Examiner* — Eric Thomas
(74) *Attorney, Agent, or Firm* — McDermott Will & Emery LLP

(57) ABSTRACT

A metallized film capacitor includes: a first dielectric film; a first metal deposition electrode provided to a first surface of the first dielectric film; a second dielectric film; and a second metal deposition electrode that is provided to a first surface of the second dielectric film and that faces the first dielectric film. The metallized film capacitor further includes: a low resistance provided above at least one of a first end of the first metal deposition electrode and a first end of the second metal deposition electrode; and a first film that covers at least a portion of the low resistance and that comprises mainly aluminum oxide.

16 Claims, 6 Drawing Sheets

(51) Int. Cl.
*H01G 4/18* (2006.01)
*H01G 4/012* (2006.01)

(58) Field of Classification Search
USPC .............................. 361/273, 303, 323, 301.5
See application file for complete search history.

(56) References Cited

U.S. PATENT DOCUMENTS

| | | | | |
|---|---|---|---|---|
| 7,697,261 | B2* | 4/2010 | Okuno | H01G 2/08 |
| | | | | 361/273 |
| 2005/0117279 | A1* | 6/2005 | Kobayashi | H01G 9/012 |
| | | | | 361/523 |
| 2009/0159322 | A1* | 6/2009 | Wu | H01G 9/012 |
| | | | | 174/260 |
| 2012/0218679 | A1 | 8/2012 | Takeoka et al. | |
| 2014/0009865 | A1 | 1/2014 | Takeoka et al. | |

FOREIGN PATENT DOCUMENTS

| | | |
|---|---|---|
| JP | 54-45946 | 3/1979 |
| JP | 02-250306 A | 10/1990 |
| JP | 09-102434 A | 4/1997 |
| JP | 09-326328 A | 12/1997 |
| JP | 11-501455 A | 2/1999 |
| JP | 2009-049139 A | 3/2009 |
| JP | 2010-062410 A | 3/2010 |
| JP | 2011-187865 A | 9/2011 |
| WO | 2011/055517 | 5/2011 |

OTHER PUBLICATIONS

International Search Report issued in International Application No. PCT/JP2013/003275 with Date of mailing Jul. 30, 2013, with English Translation.
English Translation of Chinese Search Report dated Sep. 7, 2016 for the related Chinese Patent Application No. 201380027383.5.

* cited by examiner

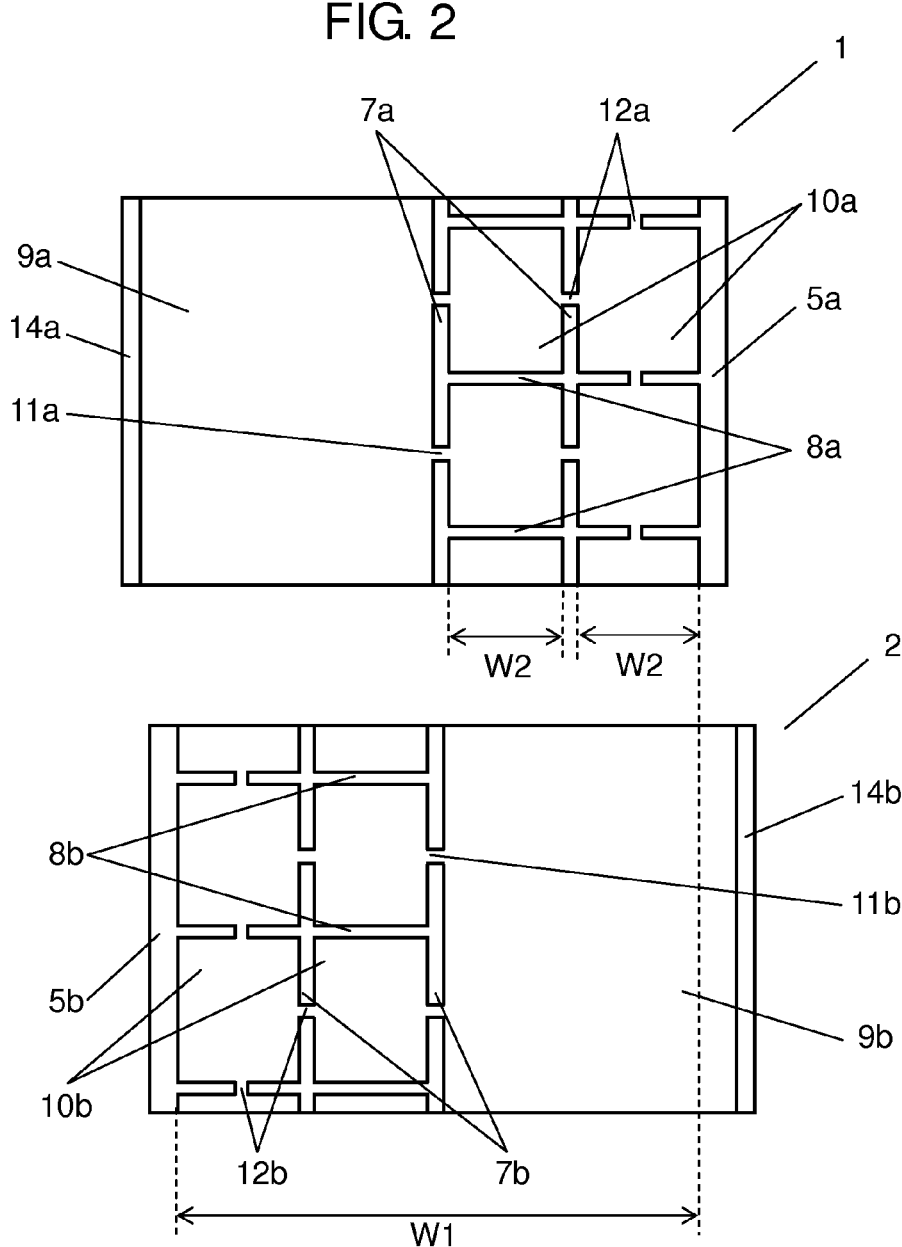

US 9,640,324 B2

METALLIZED FILM CAPACITOR

RELATED APPLICATIONS

This application is a National Phase of International Application No. PCT/JP2013/003275, filed on May 23, 2013, which in turn claims the benefit of Japanese Application No. 2012-125726, filed on Jun. 1, 2012, the disclosures of which Applications are incorporated by reference herein.

TECHNICAL FIELD

The present technical field relates to metallized film capacitors used in electronic devices, electrical devices, industrial equipment, vehicles, and the like. More particularly, the present technical field relates to metallized film capacitors most suitable for smoothing, filtering, and snubbing of motor driving inverter circuits for hybrid vehicles.

BACKGROUND ARTS

Recently, in view of environmental protection, development has been made on electrical devices controlled by inverter circuits to save energy and increase efficiency. In the automobile industry, hybrid electric vehicles (hereinafter, referred to as "HEVs") powered by electric motors and an engine have been developed. Various techniques have increasingly been conceived to meet the requirements of global environmental concerns, energy saving, and efficiency improvement.

The electric motors used in such HEVs have operating voltages as high as several hundred volts. The electric motors thus use metallized film capacitors with electrical abilities to withstand high voltages and reduce losses. Furthermore, to meet the demands of maintenance free, the metallized film capacitors having a long life are used.

Metallized film capacitors are mainly classified into a metal foil electrode type and a metal deposition electrode type. In the metal foil electrode type, metal foils serve as electrodes. In the metal deposition electrode type, metal vapor-deposited on a dielectric film serves as electrodes. Metallized film capacitors of the metal deposition electrode type have electrodes with smaller dimensions compared to dimensions of electrodes in the metal foil capacitors, and are thus capable of reducing weight and size. The metal deposition electrode type also offers self-healing properties unique to metal deposition electrodes to reliably prevent insulation breakdown. The generally-called self-healing properties are properties in that a metal deposition electrode close to a defect is evaporated and dispersed to restore capacitor properties.

FIG. 7 is a cross-sectional view of one of such conventional metallized film capacitors. FIG. 8 shows plan views of a metallized film in the conventional metallized film capacitor. Aluminum is vapor-deposited on first surfaces of dielectric films 102a and 102b, such as polypropylene films, to form metal deposition electrodes 101a and 101b, respectively. However, metal deposition electrode 101a is not provided to insulation margin 103a at one end of dielectric film 102a. Likewise, metal deposition electrode 101b is not provided to insulation margin 103b at one end of dielectric film 102b. The other end of dielectric film 102a not having insulation margin 103a is connected to metal deposition electrode 101a and metallikon electrode 104a. The other end of dielectric film 102b not having insulation margin 103b is connected to metal deposition electrode 101b and metallikon electrode 104b. The above structure allows the electrodes to extend outward. Metallikon electrodes 104a and 104b are formed by zinc spraying.

Metal deposition electrode 101a is partly divided into a plurality of divided electrodes 106a separated by slits 105a. Divided electrodes 106a are provided from a substantial center of width W1 of an effective electrode part having capacitance toward insulation margin 103a. Metal deposition electrode 101b is partly divided into a plurality of divided electrodes 106b separated by slits 105b. Divided electrodes 106b are provided from the substantial center of width W1 of the effective electrode part having capacitance toward insulation margin 103b. Prior to forming metal deposition electrode 101a, an oil layer is previously formed at positions corresponding to slits 105a on dielectric film 102a, so that metal deposition electrode 101a is not formed on slits 105a. Prior to forming metal deposition electrode 101b, an oil layer is previously formed at positions corresponding to slits 105b on dielectric film 102b, so that metal deposition electrode 101b is not formed on slits 105b.

Each of divided electrodes 106a is connected in parallel to main electrode 107a in metal deposition electrode 101a through fuse 108a. Each of divided electrodes 106b is connected in parallel to main electrode 107b in metal deposition electrode 101b through fuse 108b. Main electrode 107a is positioned close to metallikon electrode 104a and far from insulation margin 103a with respect to the substantial center of width W1 of the effective electrode part. Main electrode 107b is positioned close to metallikon electrode 104b and far from insulation margin 103b with respect to the substantial center of width W1 of the effective electrode part.

Metal deposition electrode 101a has thick low resistance 109a at the end in contact with metallikon electrode 104a. Metal deposition electrode 101b has thick low resistance 109b at the end in contact with metallikon electrode 104b. Low resistance 109a reduces connection resistance between metal deposition electrode 101a and metallikon electrode 104a. Low resistance 109b reduces connection resistance between metal deposition electrode 101b and metallikon electrode 104b. Low resistance 109a is formed by vapor deposition of, for example, aluminum or zinc only on the end of metal deposition electrode 101a after forming metal deposition electrode 101a. Low resistance 109b is formed by vapor deposition of, for example, aluminum or zinc only on the end of metal deposition electrode 101b after forming metal deposition electrode 101b.

Note that known prior art documents related to the present invention are, for example, Patent Literatures 1 and 2 listed below.

CITATION LIST

Patent Literatures

PTL 1: Japanese Unexamined Patent Application Publication No. H9-102434
PTL 2: Japanese Unexamined Patent Application Publication No. H2-250306

SUMMARY OF THE INVENTION

A metallized film capacitor includes: a first dielectric film; a first metal deposition electrode provided to a first surface of the first dielectric film; a second dielectric film; a second metal deposition electrode that is provided to a first surface of the second dielectric film and that faces the first dielectric film. The metallized film capacitor further includes: a low resistance provided above at least one of a first end of the first metal deposition electrode and a first end of the second metal deposition electrode; a first metallikon electrode connected to the first end of the first metal deposition electrode. The metallized film capacitor still further includes: a second metallikon electrode connected to the first end of the second metal deposition electrode; and a first film covering at least a portion of the low resistance, the first film comprising mainly aluminum oxide.

BRIEF DESCRIPTION OF DRAWINGS

FIG. 2 shows plan views of metallized films in the metallized film capacitor according to the present embodiment.

DESCRIPTION OF EMBODIMENT

Metallized film capacitors used in HEVs are often subjected to severe environments, and therefore required to improve their weather resistance such as moisture resistance.

Figure 7:
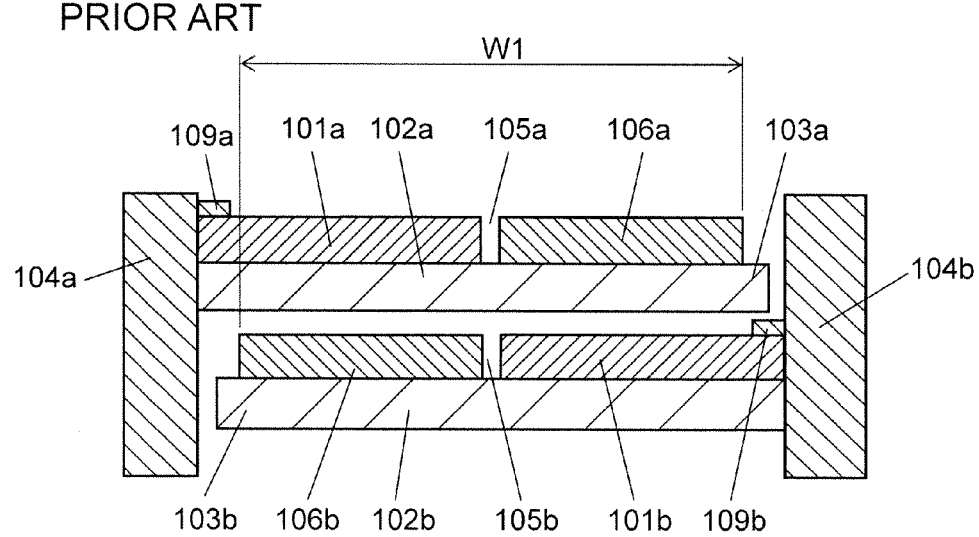
FIG. 7 is a cross-sectional view of a conventional metallized film capacitor.
Figure 8:
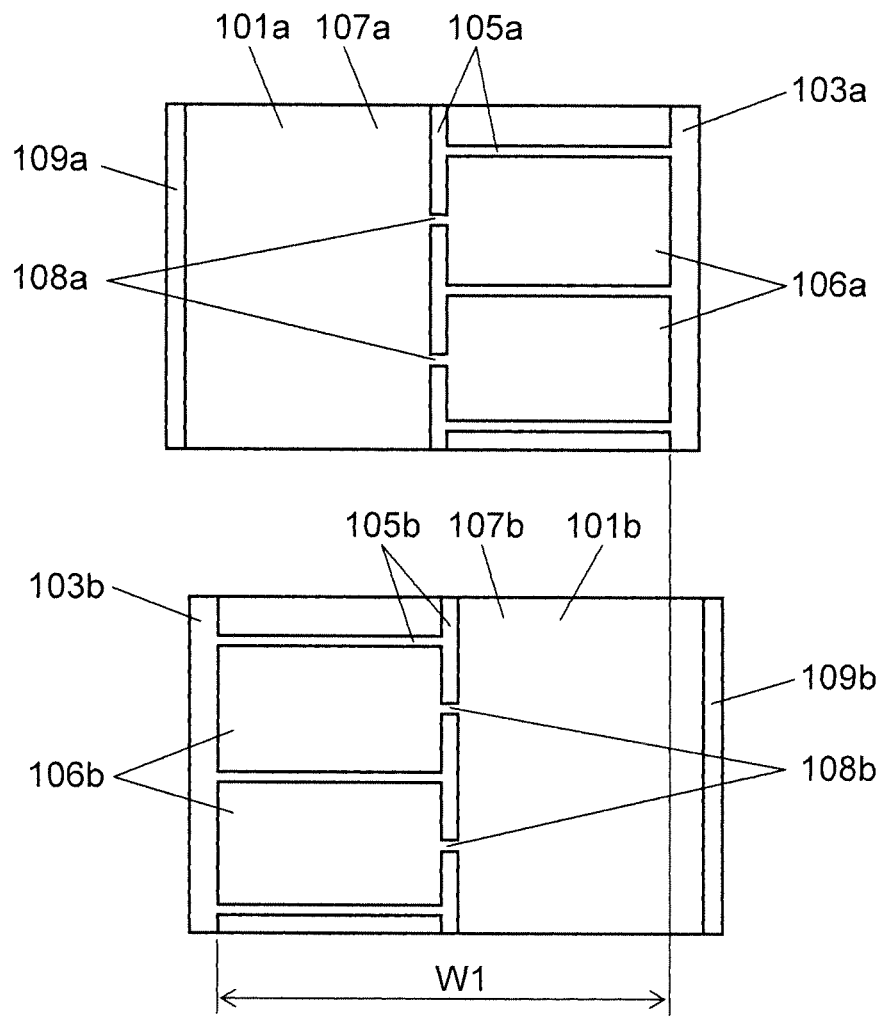
FIG. 8 shows plan views of metallized films in the conventional metallized film capacitor.

There is a possibility that water enters a metallized film capacitor through a gap at the boundary between metallikon electrode 104a and dielectric film 102a or between metallikon electrode 104b and dielectric film 102b illustrated in FIG. 7. Therefore, low resistance 109a in contact with metallikon electrode 104a and low resistance 109b in contact with metallikon electrode 104b are likely to be affected by water exposure. If low resistance 109a or 109b is exposed by water and decomposed, contact properties between deposition electrode 101a and metallikon electrode 104a or between metal deposition electrode 101b and metallikon electrode 104b is decreased. As a result, capacitor characteristics of the metallized film capacitor are deteriorated. Therefore, in order to enhance reliability of the metallized film capacitor, it is necessary to increase moisture resistance of low resistances 109a and 109b.

Figure 1:
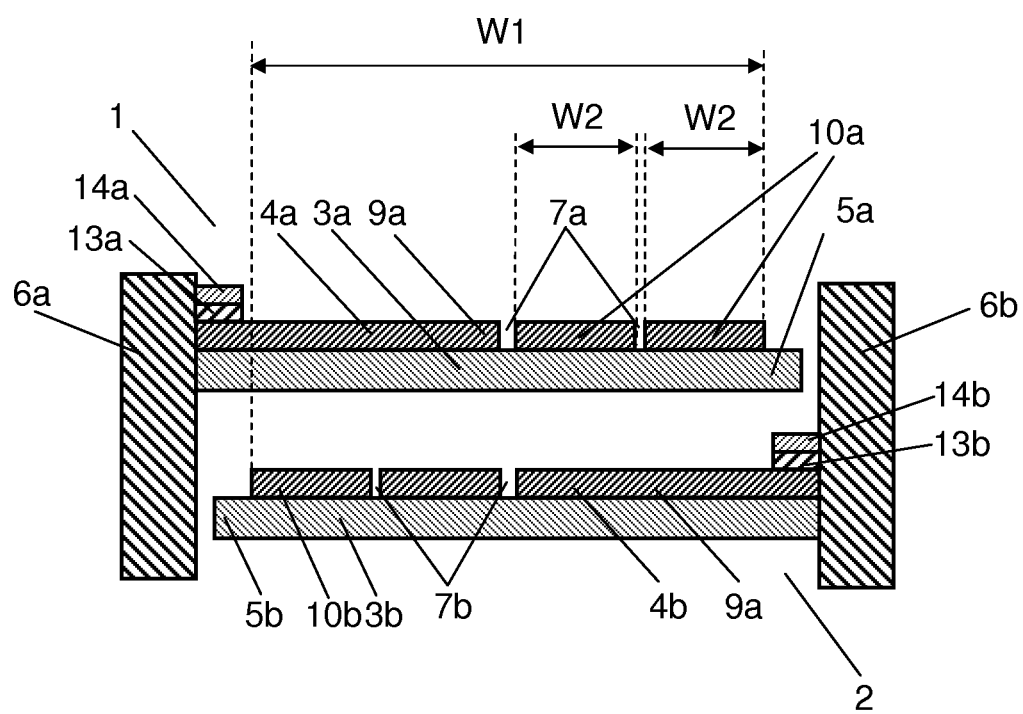
FIG. 1 is a cross-sectional view of a metallized film capacitor according to the present embodiment.

FIG. 1 is a cross-sectional view of a metallized film capacitor according to the present embodiment. FIG. 2 shows plan views of metallized films in the metallized film capacitor according to the present embodiment.

The metallized film capacitor includes: a first dielectric film (dielectric film 3a): a first metal deposition electrode (metal deposition electrode 4a) provided to a first surface of the first dielectric film; a second dielectric film (dielectric film 3b); and a second metal deposition electrode (metal deposition electrode 4b) provided to a first surface of the second dielectric film. Furthermore, the metallized film capacitor includes at least one of: low resistance 13a on a first end of the first metal deposition electrode; and low resistance 13b on a first end of the second metal deposition electrode. The metallized film capacitor also includes at least one of first films (films 14a and 14b) each comprising mainly aluminum oxide. First film (film 14a) covers at least a portion of low resistance 13a. First film (film 14b) covers at least a portion of low resistance 13b. The first dielectric film faces the second metal deposition electrode.

First metallized film 1 serves as an P-pole, while second metallized film 2 serves as an N-pole. First metallized film 1 and second metallized film 2 are piled on each other in a pair, and wound together a plurality of times to form an element serving as the metallized film capacitor. In this example, first metallized film 1 and second metallized film 2 are wound offset from each other by 1 mm in a width direction (horizontal direction in FIG. 1) to extend the electrodes outward.

Metal deposition electrode 4a comprising aluminum or the like is provided on the first surface of dielectric film 3a, such as a polypropylene film. Dielectric film 3a has an end with insulation margin 5a. Metal deposition electrode 4a is not provided to insulation margin 5a so as to be insulated from second metallized film 2. Insulation margin 5a has a width of 2 mm. Dielectric film 3a is a polypropylene film having a thickness of 3.0 μm.

Metal deposition electrode 4a is connected to metallikon electrode 6a, so that the electrode part extends outward. Metallikon electrodes 6a is formed by, for example, zinc spraying on the end surface of dielectric film 3a and on the end surface of metal deposition electrode 4a.

As illustrated in FIG. 2, metal deposition electrode 4a is divided into main electrode 9a and a plurality of divided electrodes 10a by vertical slits 7a and horizontal slits 8a. Prior to forming metal deposition electrode 4a, an oil layer is previously formed at positions corresponding to vertical slits 7a and horizontal slits 8a on dielectric film 3a, so that metal deposition electrode 4a is not formed on vertical slits 7a and horizontal slits 8a. Vertical slits 7a and horizontal slits 8a are provided from the substantial center of width W1 of the effective electrode part having capacitance in metal deposition electrode 4a toward insulation margin 5a.

As illustrated in FIG. 2, each of divided electrodes 10a is electrically connected in parallel to main electrode 9a through fuse 11a. Neighboring divided electrodes 10a are electrically connected to each other through fuse 12a. Main electrode 9a is provided to the first surface of dielectric film 3a from the substantial center of width W1 of the effective electrode part to metallikon electrode 6a. Each of divided electrodes 10a has width W2 that is approximately one fourth of width W1 of the effective electrode part. Divided electrodes 10a are provided to the first surface of dielectric film 3a from the substantial center of width W1 of the effective electrode part to insulation margin 5a. According to the present embodiment, there are two divided electrodes 10a arranged in the direction from the substantial center of width W1 of the effective electrode part to insulation margin 5a. However, the present embodiment is not limited to this structure, and there may be three or more divided electrodes 10a in the above direction.

In use, if short circuit occurs at a defect in dielectric film 3a, energy of short circuit causes metal deposition electrode 4a around the defect to be evaporated and dispersed, thereby restoring insulation properties (self-healing properties). For example, there is a situation where slight insulation breakdown occurs in dielectric film 3a, and a through-hole is thereby formed to cause short circuit at metal deposition electrode 4a that has been insulated by dielectric film 3a. In this case, metal deposition electrode 4a around the through-hole is evaporated due to energy of the short circuit, and no metal deposition electrode 4a is thereby left around the through-hole. As a result, short circuit disappears and insulation properties of metal deposition electrode 4a are restored. The self-healing properties restore properties of metallized film capacitor even if short circuit occurs in a portion between first metallized film 1 and second metallized film 2. Furthermore, if a large amount of current flows into divided electrode 10a due to a trouble of divided electrode 10a, fuse 11a or fuse 12a is dispersed. As a result, the troubled portion of divided electrode 10a is electrically disconnected, and current of the metallized film capacitor is back to a normal state.

Like first metallized film 1, second metallized film 2 has metal deposition electrode 4b that is provided to the first surface of dielectric film 3b, such as a polypropylene film. Dielectric film 3b has an end with insulation margin 5b. Metal deposition electrode 4b is not provided to insulation margin 5b. Insulation margin 5b has a width of 2 mm. Second metallized film 2 is connected to metallikon electrode 6b. Second metallized film 2 and first metallized film 1 are connected to respective metallikon electrodes in different directions. More specifically, referring to FIG. 1, the left end of first metallized film 1 is connected to metallikon electrode 6a, while the right end of second metallized film 2 is connected to metallikon electrode 6b. Metallikon electrode 6b faces metallikon electrode 6a. First metallized film 1 and second metallized film 2 are located between metallikon electrode 6a and metallikon electrode 6b. Metal deposition electrode 4b is partly provided from the substantial center of width W1 of the effective electrode part having capacitance toward insulation margin 5b. Prior to forming metal deposition electrode 4b, an oil layer is previously formed at positions corresponding to vertical slits 7b and horizontal slits 8b on dielectric film 3b, so that metal deposition electrode 4b is not formed on vertical slits 7b and horizontal slits 8b. Vertical slits 7b and horizontal slits 8b partition main electrode 9b and divided electrodes 10b from one another.

As illustrated in FIG. 2, the structure of divided electrodes 10b is similar to the structure of divided electrodes 10a of first metallized film 1. Each of divided electrodes 10b is connected in parallel to main electrode 9b through fuse 11b. Neighboring divided electrodes 10b are connected in parallel to each other through fuse 12b. The provision of divided electrodes 10b and fuses 11b and 12b in second metallized film 2 produces the same effects as those of first metallized film 1.

Low resistance 13a is provided on the end of metal deposition electrode 4a in contact with metallikon electrode 6a. Low resistance 13b is provided on the end of metal deposition electrode 4b in contact with metallikon electrode 6b. Therefore, the region where metal deposition electrode 4a is in contact with metallikon electrode 6a is thicker than the center region of metal deposition electrode 4a. Likewise, the region where metal deposition electrode 4b is in contact with metallikon electrode 6b is thicker than the center region of metal deposition electrode 4b. Low resistance 13a increases contact properties between metal deposition electrode 4a and metallikon electrode 6a, and low resistance 13b increases contact properties between metal deposition electrode 4b and metallikon electrode 6b. As a result, the connection resistance is reduced.

Note that low resistances 13a and 13b are formed by depositing zinc on metal deposition electrodes 4a and 4b, respectively. It is preferable to form low resistances 13a and 13b from zinc for the reason described below. However, it is also possible to use not zinc but aluminum in low resistances 13a and 13b, in the same manner as metal deposition electrodes 4a and 4b.

Low resistances 13a and 13b are covered by films 14a and 14b (first films), respectively, which comprise mainly aluminum oxide. However, films 14a and 14b may include, as impurity, components such as nitrogen, as long as characteristics of films 14a and 14b are not deteriorated. Note that "comprises mainly" means including as component having the largest atomic ratio among components in film 14a or 14b.

In short, first metallized film 1 according to the present embodiment has a structure in which dielectric film 3a, metal deposition electrode 4a, and low resistance 13a are stacked. Low resistance 13a is covered by film 14a. Second metallized film 2 has a structure in which dielectric film 3b, metal deposition electrode 4b, and low resistance 13b are stacked. Low resistance 13b is covered by film 14b.

Referring to FIG. 1, the top surfaces of low resistances 13a and 13b are covered by films 14a and 14b, respectively. However, the present embodiment is not limited to the above structure. For example, it is also possible that low resistances 13a and 13b are completely covered by films 14a and 14b, respectively. In other words, not only the top surfaces but also side surfaces of low resistances 13a and 13b illustrated in FIG. 1 may be covered by films 14a and 14b, respectively. In view of reliability, it is more preferable that low resistances 13a and 13b are completely covered by films 14a and 14b.

Figure 3A:
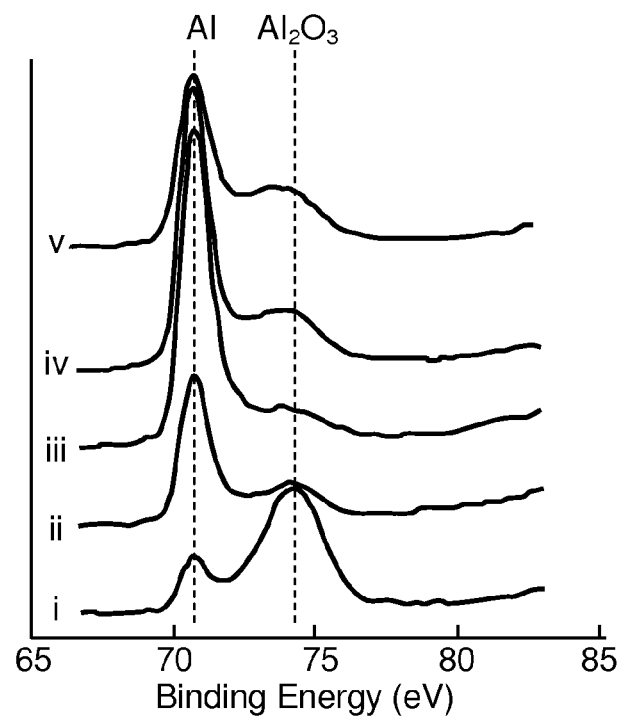
FIG. 3A is a graph plotting concentration changes of aluminum and aluminum oxide in the metallized film capacitor in a depth direction, according to the present embodiment.
Figure 3B:
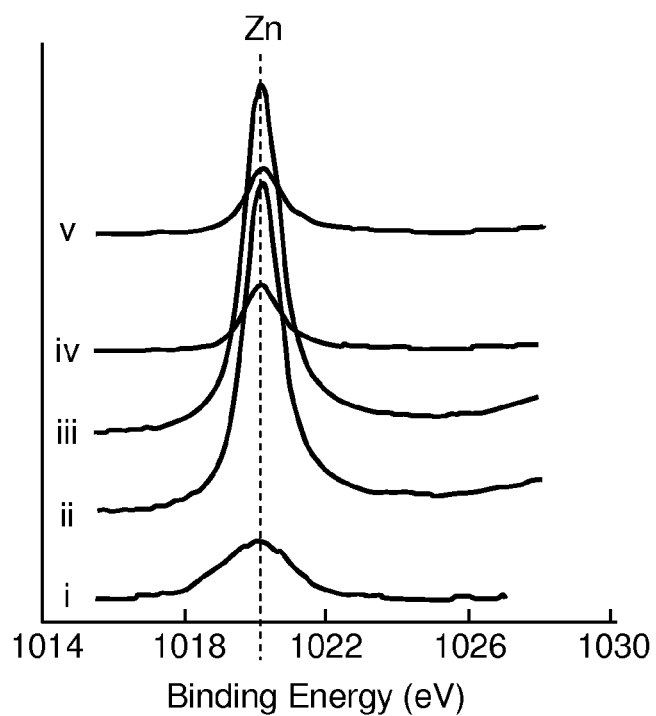
FIG. 3B is a graph plotting concentration changes of zinc in the metallized film capacitor in a depth direction, according to the present embodiment.

Next, referring to FIGS. 3A and 3B, composition in each of metal deposition electrode 4a, low resistance 13a, and film 14a in first metallized film 1 is described in more detail. Metal deposition electrode 4a comprises aluminum, low resistance 13a comprises zinc, and film 14a comprises aluminum oxide.

FIG. 3A is a graph plotting concentration changes of aluminum and aluminum oxide in the metallized film capacitor in a depth direction, according to the present embodiment. FIG. 3B is a graph plotting concentration changes of zinc in the metallized film capacitor in a depth direction, according to the present embodiment.

In FIG. 3A, curves i to v represent changes of element concentration of aluminum and aluminum oxide in a depth direction (direction from film 14a to metal deposition electrode 4a). The changes of element concentration are detected by alternately repeating XPS (X-ray Photoemission Spectroscopy) and ion sputtering, thereby following changes of a spectrum, and measuring a peak position and intensity of binding energy at each depth. Note that curves i to v are measured at respective depths that are gradually deeper in an order of i, ii, iii, iv, and v. Curve i is measured at a top layer portion, and curve v is measured at the deepest portion. On the other hand, in FIG. 3B, curves i to v represent changes of element concentration of zinc in the depth direction, and are measured at respective depths that are gradually deeper in an order of i, ii, iii, iv, and v. The depths corresponding to curves i to v in FIG. 3B are the same as the depths corresponding to curves i to v in FIG. 3A.

Curve i in each of FIGS. 3A and 3B represents components in the top layer of film 14a. Curve i shows that the top layer contains aluminum oxide as the largest amount of component. However, curve is also shows that there are also a slight amount of aluminum and zinc in the layer of film 14a. Curves ii and iii represent components in low resistance 13a. At these depths, the concentration of zinc is significantly high. According to curve iii, not only concentration of zinc but also concentration of aluminum is high. Therefore, zinc and aluminum are slightly mixed in the layer of low resistance 13a. Curves iv and v represent components in metal deposition electrode 4a. In metal deposition electrode 4a, concentration of zinc is decreased, and aluminum occupies most of the components.

Note that the above description is given for metal deposition electrode 4a, low resistance 13a, and film 14a in first metallized film 1. Second metallized film 2 is also manufactured in the essentially same method as the method for manufacturing first metallized film 1, although the direction connected to the metallikon electrode is different. Therefore, metal deposition electrode 4b, low resistance 13b, film 14b have the essentially same structures as those of metal deposition electrode 4a, low resistance 13a, and film 14a, respectively.

Next, the description is given for how characteristics of the metallized film capacitor are influenced by variations of a thickness of each of films 14a and 14b in the metallized film capacitor according to the present embodiment, with reference to Table 1.

TABLE 1

|  | Sample A | Sample B | Sample C | Sample D | Sample E |
| --- | --- | --- | --- | --- | --- |
| Depth (nm) at which an intensity ratio of $Al_2O_3/Al$ is smaller than 1 | 0 | 20 | 25 | 30 | 40 |
| tanδ before moisture resistance test | 1.00 (reference) | 1.00 | 1.05 | 1.20 | 1.50 |
| tanδ after moisture resistance test | 1.20 | 1.10 | 1.07 | 1.05 | 1.03 |

Table 1 shows results of preparing samples A, B, C, D, and E and measuring tan δ before and after a moisture resistance test on each of the samples. A depth causing an intensity ratio ($Al_2O_3/Al$) of biding energy of aluminum oxide to aluminum to be smaller than 1 is 0 nm for sample A, 20 nm for sample B, 25 nm for sample C, 30 nm for sample D, and 40 nm for sample E. Here, tan δ represents dielectric loss tangent. tan δ is a value expressed by Ir/Ic, where Ic is an ideal capacitor current and Ir is energy loss. According to the present embodiment, an LCR meter (E4980A) manufactured by Agilent Technologies is used to measure tan δ at a frequency of 1 kHz. Sample A does not have films 14a and 14b. In an order from sample A to sample E, each of films 14a and 14b is gradually thicker. Table 1 shows tan δ before and after a moisture resistance test on each of samples A to D. Tan δ of each sample is expressed by an index with reference to (1.00) that is tan δ of sample A before the moisture resistance test. Note that, in the moisture resistance tests, a voltage of 500 V is applied for 2000 hours under the conditions of a high temperature of 85° C. and a high humidity of 85% r. h.

It is seen in Table 1 that, after the moisture resistance test, tan δ of samples B to E each having films 14a and 14b is smaller than tan δ of sample A. It is therefore seen that the metallized film capacitor according to the present embodiment has high moisture resistance and high reliability.

However, for samples D and E each having relatively thick films 14a and 14b, at depths of 30 nm and 40 nm, respectively, at which an intensity ratio is smaller than 1, initial tan δ (before moisture resistance tests) are 1.20 and 1.50, respectively, which are slightly greater. It is supposed that the above results from that, as films 14a and 14b each comprising aluminum oxide that is insulator are thick, contact properties between low resistance 13a comprising zinc and metallikon electrode 6a and between low resistance 13b comprising zinc and metallikon electrode 6b are reduced. Therefore, it is preferable that each of films 14a and 14b is formed so that a depth at which an intensity ratio of aluminum oxide to aluminum is smaller than 1 is greater than 0 nm and at most 25 nm.

Note that each of low resistances 13a and 13b may comprise a metal such as aluminum, but preferably comprises zinc. Since zinc has a relatively low melting point, zinc can be formed on a thick metal deposition film with low thermal load to dielectric films 3a and 3b. Therefore, low resistances 13a and 13b and reliable metal deposition electrodes 4a and 4b are desirably formed. Therefore, the provision of low resistances 13a and 13b each comprising zinc results in desirable contact properties between metal deposition electrode 4a and metallikon electrode 6a and between metal deposition electrode 4b and metallikon electrode 6b. However, a zinc deposition film easily tarnishes in air in comparison to a metal such as aluminum. Therefore, zinc has less long-term reliability.

According to the present embodiment, low resistances 13a and 13b comprising zinc are covered by films 14a and 14b, respectively, each of which comprises mainly aluminum oxide. This structure suppresses corrosion of low resistances 13a and 13b comprising zinc. It is therefore possible to keep, for a long time, desirable contact properties between metal deposition electrode 4a comprising zinc and metallikon electrode 6a and between metal deposition electrode 4b comprising zinc and metallikon electrode 6b. For the above reason, the present embodiment is useful especially for metallized film capacitors using zinc in low resistances 13a and 13b.

As described above, the metallized film capacitor according to the present embodiment is capable of suppressing progress of corrosion of low resistances 13a and 13b, thereby offering high reliability.

In other words, in the metallized film capacitor according to the present embodiment, films 14a and 14b comprising aluminum oxide are capable of preventing water from entering low resistances 13a and 13b, respectively. As a result, progress of corrosion of low resistances 13a and 13b can be suppressed. Therefore, low resistance 13a can keep desirable contact properties between metal deposition electrode 4a and metallikon electrode 6a, and low resistance 13b can keep desirable contact properties between metal deposition electrode 4b and metallikon electrode 6b. As a result, deterioration of capacitor characteristics of the metallized film capacitor is suppressed, and reliability of the metallized film capacitor is increased.

Figure 4:
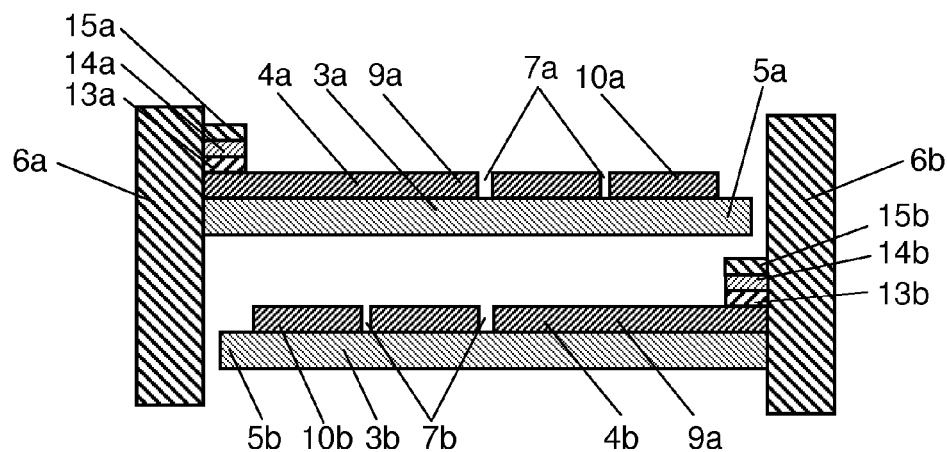
FIG. 4 is a cross-sectional view of another metallized film capacitor according to the present embodiment.

Next, referring to FIG. 4, a structure of another metallized film capacitor according to the present embodiment is described. Note that the structural elements in FIG. 4 which are substantially identical to the structural elements in FIG. 1 are not explained again below. FIG. 4 is a cross-sectional view of the other metallized film capacitor according to the present embodiment.

The metallized film capacitor illustrated in FIG. 4 differs from the metallized film capacitor illustrated in FIG. 1 in that second film 15a is provided on film 14a, and second film 15b is provided on film 14b.

In FIG. 4, second film 15a completely covers the top surface of film 14a, and second film 15b completely covers the top surface of film 14b. However, it is also possible that second film 15a covers a portion of film 14a, and second film 15b covers a portion of film 14b.

Second films 15a and 15b comprise mainly magnesium oxide. However, second films 15a and 15b may include, as impurity, component such as nitrogen as long as the characteristics of second films 15a and 15b are not deteriorated. Note that "comprises mainly" means including as component having the largest atomic ratio among components in second film 15a or 15b.

By covering films 14a and 14b by second films 15a and 15b, respectively, it is possible to suppress corrosion of low resistances 13a and 13b, respectively, and keep, for a long time, highly desirable contact properties between metal deposition electrode 4a and metallikon electrode 6a and between metal deposition electrode 4b and metallikon electrode 6b.

Note that magnesium which is not oxidized may be included in each of second films 15a and 15b comprising magnesium oxide. According to Pourbaix index indicating thermodynamic stability of metal to water, metals are likely to react with water in an order of Mg>Be>Ti>Al>Mn> . . . , which means magnesium has higher reactivity to water than reactivity of aluminum. Magnesium has highly desirable properties of removing water entering the inside of the metallized film capacitor. Therefore, the provision of second films 15a and 15b can further suppress exposure of low resistances 13a and 13b to entering water. As a result, it is possible to suppress corrosion progress of low resistances 13a and 13b, thereby offering high reliability.

Note that, in the metallized film capacitor in FIG. 4, both of films 14a and 14b are covered by second films 15a and 15b, respectively. However, the present embodiment is not limited to this structure. It is also possible that either film 14a or film 14b is covered by a second film comprising mainly magnesium oxide.

Although, in the present embodiment, films comprising mainly magnesium oxide are used as second films 15a and 15b, the present embodiment is not limited to this structure. It is also possible to use, as second films 15a and 15b, films each comprising a substance with higher reactivity to water than reactivity of aluminum to water. For example, films each comprising mainly beryllium oxide or titanium oxide may be used as second films 15a and 15b.

Figure 5:
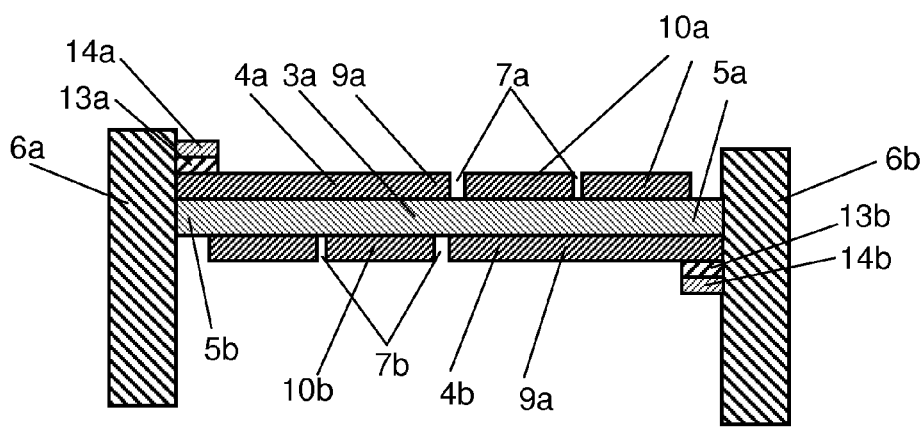
FIG. 5 is a cross-sectional view of still another metallized film capacitor according to the present embodiment.

Furthermore, as illustrated in FIG. 5, it is also possible that metal deposition electrode 4a, low resistance 13a, and film 14a are provided to the first surface of dielectric film 3a, and metal deposition electrode 4b, low resistance 13b, and film 14b are provided to a second surface of dielectric film 3a which is a surface on the reverse side of the first surface.

Figure 6:
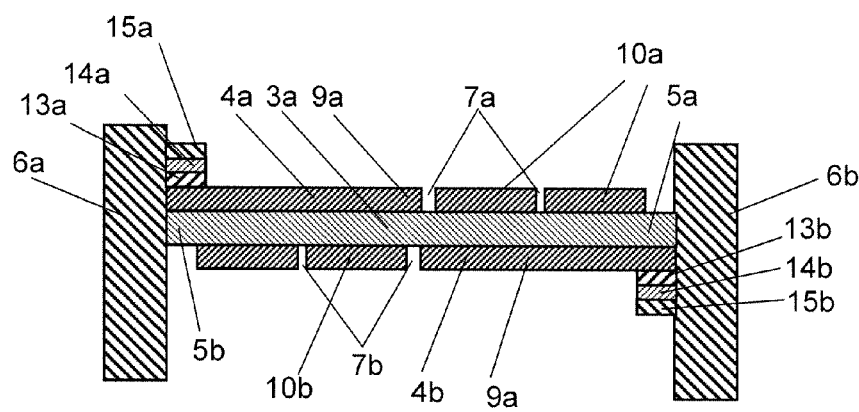
FIG. 6 is a cross-sectional view of still another metallized film capacitor according to the present embodiment.

Moreover, as illustrated in FIG. 6, it is further possible that second film 15a is provided on film 14a in metallized film capacitor illustrated in FIG. 5, and that second film 15b is provided on film 14b in metallized film capacitor illustrated in FIG. 5.

Note that the present invention is not limited to the above-described embodiment. Various modifications of the present embodiment may be possible within a scope of the present invention. For example, in FIGS. 1 and 4 to 6, both low resistances 13a and 13b are covered by films 14a and 14b, respectively. However, the present invention is not limited to these structures. Certain effects can be produced even if either low resistance 13a or low resistance 13b is covered by a film comprising mainly aluminum oxide. Furthermore, the certain effects can be produced even if not the entire top surface but a portion of the top surface of each of the low resistances 13a and 13b is covered by a corresponding one of films 14a and 14b. It is further possible to provide only one of low resistances 13a and 13b.

Note that, in the present embodiment, dielectric films 3a and 3b are polypropylene films. However, dielectric films 3a and 3b are not limited to polypropylene films, but may be polyethylene terephthalate films, polyethylene naphthalate films, polyphenylsulfide films, polystyrene films, or the like. Note that, in the present embodiment, aluminum is vapor-deposited to form metal deposition electrodes 4a and 4b. However, metal deposition electrodes 4a and 4b may be formed not only by the above way but also by vapor deposition of zinc, an alloy of aluminum and magnesium, or the like. In particular, if an alloy of aluminum and magnesium is used as metal deposition electrodes 4a and 4b, magnesium is reacted with water in polypropylene films serving as dielectric films 3a and 3b, thereby forming respective oxide films. Therefore, it is also possible to improve moisture resistance not only for the films but also for the entire metallized film capacitor.

Note that, in the present embodiment, the description is given for a metallized film capacitor in which films are wound together as an example. However, the present invention is not limited to this. The present invention can be applied to a metallized film capacitor in which films are stacked together.

INDUSTRIAL APPLICABILITY

The metallized film capacitor according to the present embodiment has high reliability. The metallized film capacitor according to the present embodiment is therefore used as a capacitor in electronic devices, electrical devices, industrial equipment, vehicles, and the like. In particular, the metallized film capacitor according to the present embodiment is useful as a capacitor in the filed of vehicles in which high moisture resistance is required.

REFERENCE MARKS IN THE DRAWINGS 1 first metallized film
2 second metallized film
3a, 3b dielectric film
4a, 4b metal deposition electrode
5a, 5b insulation margin
6a, 6b metallikon electrode
7a, 7b vertical slit
8a, 8b horizontal slit
9a, 9b main electrode
10a, 10b divided electrode
11a, 11b fuse
12a, 12b fuse
13a, 13b low resistance
14a, 14b film
15a, 15b second film

The invention claimed is:
1. A metallized film capacitor comprising:
a first dielectric film;
a first metal deposition electrode provided to a first surface of the first dielectric film;
a second dielectric film;
a second metal deposition electrode provided to a first surface of the second dielectric film, and facing the first dielectric film;
a low resistance portion provided on at least one of a first end of the first metal deposition electrode and a first end of the second metal deposition electrode;

a first metallikon electrode connected to the first end of the first metal deposition electrode;

a second metallikon electrode connected to the first end of the second metal deposition electrode; and a first film formed only on a surface of the low resistance portion, covering at least a portion of the low resistance portion, and comprising mainly aluminum oxide that is an insulator.

2. The metallized film capacitor according to claim 1, further comprising:

a second film comprising a substance having reactivity to water, the reactivity being higher than reactivity of aluminum to water, wherein the second film covers at least a portion of the first film.

3. The metallized film capacitor according to claim 1, further comprising:

a second film comprising mainly magnesium oxide, wherein the second film covers at least a portion of the first film.

4. The metallized film capacitor according to claim 1, wherein the first film further comprises aluminum, and a depth, at which an intensity ratio of binding energy of the aluminum oxide to the aluminum in the first film is smaller than 1, is greater than 0 nm and at most 25 nm.

5. The metallized film capacitor according to claim 1, wherein at least one of the first metal deposition electrode and the second metal deposition electrode comprises an alloy of aluminum and magnesium.

6. The metallized film capacitor according to claim 1, wherein the low resistance portion comprises zinc.

7. A metallized film capacitor comprising:

a first dielectric film;

a first metal deposition electrode provided to a first surface of the first dielectric film;

a second metal deposition electrode provided to a second surface of the first dielectric film, the second surface being on a reverse side of the first surface;

a low resistance portion provided on at least one of a first end of the first metal deposition electrode and a first end of the second metal deposition electrode;

a first metallikon electrode connected to the first end of the first metal deposition electrode;

a second metallikon electrode connected to the first end of the second metal deposition electrode; and a first film formed only on a surface of the low resistance portion, covering at least a portion of the low resistance portion, and comprising mainly aluminum oxide that is an insulator.

8. The metallized film capacitor according to claim 7, further comprising:

a second film comprising a substance having reactivity to water, the reactivity being higher than reactivity of aluminum to water, wherein the second film covers at least a portion of the first film.

9. The metallized film capacitor according to claim 7, further comprising:

a second film comprising mainly magnesium oxide, wherein the second film covers at least a portion of the first film.

10. The metallized film capacitor according to claim 7, wherein the first film further comprises aluminum, and a depth, at which an intensity ratio of binding energy of the aluminum oxide to the aluminum in the first film is smaller than 1, is greater than 0 nm and at most 25 nm.

11. The metallized film capacitor according to claim 7, wherein at least one of the first metal deposition electrode and the second metal deposition electrode comprises an alloy of aluminum and magnesium.

12. The metallized film capacitor according to claim 7, wherein the low resistance portion comprises zinc.

13. A metallized film capacitor comprising:

a first dielectric film;

a first metal deposition electrode provided to a first surface of the first dielectric film;

a second dielectric film;

a second metal deposition electrode provided to a first surface of the second dielectric film, and facing the first dielectric film;

a low resistance portion provided on at least one of a first end of the first metal deposition electrode and a first end of the second metal deposition electrode;

a first metallikon electrode connected to the first end of the first metal deposition electrode;

a second metallikon electrode connected to the first end of the second metal deposition electrode;

a first film covering at least a portion of the low resistance portion, and comprising mainly aluminum oxide; and a second film comprising a substance having reactivity to water, the reactivity being higher than reactivity of aluminum to water, wherein the second film covers at least a portion of the first film.

14. The metallized film capacitor according to claim 13, wherein the second film comprises mainly magnesium oxide.

15. A metallized film capacitor comprising:

a first dielectric film;

a first metal deposition electrode provided to a first surface of the first dielectric film;

a second metal deposition electrode provided to a second surface of the first dielectric film, the second surface being on a reverse side of the first surface;

a low resistance portion provided on at least one of a first end of the first metal deposition electrode and a first end of the second metal deposition electrode;

a first metallikon electrode connected to the first end of the first metal deposition electrode;

a second metallikon electrode connected to the first end of the second metal deposition electrode;

a first film covering at least a portion of the low resistance portion, and comprising mainly aluminum oxide; and a second film comprising a substance having reactivity to water, the reactivity being higher than reactivity of aluminum to water, wherein the second film covers at least a portion of the first film.

16. The metallized film capacitor according to claim 15, wherein the second film comprising mainly magnesium oxide.

* * * * *